United States Patent [19]

Adachi

[11] Patent Number: 5,477,336
[45] Date of Patent: Dec. 19, 1995

[54] APPARATUS AND METHOD OF RECORDING AND REPRODUCING VIDEO SIGNAL

[75] Inventor: Makoto Adachi, Nikko, Japan

[73] Assignee: Sharp Kabushiki Kaisha, Osaka, Japan

[21] Appl. No.: 246,461

[22] Filed: May 18, 1994

Related U.S. Application Data

[63] Continuation of Ser. No. 967,389, Oct. 28, 1992, abandoned.

[30] Foreign Application Priority Data

Oct. 31, 1991 [JP] Japan .................................. 3-286195

[51] Int. Cl.$^6$ .................................................. H04N 9/79
[52] U.S. Cl. ............................................ 358/310; 358/328
[58] Field of Search .................................... 358/310, 327, 358/314, 336, 335, 340, 320, 337, 328; 360/38.1, 36.1; 348/606, 607, 616

[56] References Cited

U.S. PATENT DOCUMENTS

| | | | |
|---|---|---|---|
| 4,656,527 | 4/1987 | Uchimi | 358/320 |
| 4,873,582 | 10/1989 | Furuhata et al. | |
| 4,910,605 | 3/1990 | Sasaki et al. | 358/310 |
| 5,034,826 | 7/1991 | Geerlings | 358/314 |
| 5,148,290 | 9/1992 | Yamaguchi et al. | 358/314 |
| 5,179,453 | 1/1993 | Tozaki | 358/336 |

FOREIGN PATENT DOCUMENTS

| | | |
|---|---|---|
| 0234483 | 9/1987 | European Pat. Off. |
| 0418180 | 3/1991 | European Pat. Off. |
| 0444699 | 9/1991 | European Pat. Off. |
| 63-194494 | 2/1987 | Japan |
| 2162923 | 7/1991 | Japan |

OTHER PUBLICATIONS

*I.T.E.J. Technical Report;* "The Specification of Consumer HD-VTR"; Yamashita et al; vol. 15; No. 50; pp. 1–12; Sep. 26, 1991.

*Excerpts of Specifications of an HD Video;* Hitachi, Ltd., Matsushita Electric Industrial Co., Ltd and Sony Corporation; pp. 1, 6–8, 37–39 and 42–43; Jul. 1991.

*Primary Examiner*—Tommy P. Chin
*Assistant Examiner*—Robert Chevalier
*Attorney, Agent, or Firm*—Birch, Stewart, Kolasch & Birch

[57] ABSTRACT

A video signal recording and reproducing apparatus in accordance with the present invention includes A/D converters, a shuffling circuit and magnetic heads. The A/D converters A/D-convert a luminance signal Y and color difference signals $P_B$ and $P_R$ included in a video signal. The shuffling circuit divides each A/D converted data into first and second channels and further divides the first and second channels into data of a first segment including the color difference signal $P_R$ and data of a second segment including the color difference signal $P_B$. The data of the first segments of the first and second channels are recorded on a magnetic tape with a spacing of one track by the magnetic heads, data of the second segment of the first channel is recorded by the magnetic head on a portion between the tracks where the first segments are recorded, and data of the second segment of the second channel is recorded on a portion adjacent to the track where the first segment of the second channel is recorded. In a hi-vision VTR, it is possible to prevent an image of improper or poor hues due to differences in characteristics between the channels and enhance a capability of dropout compensation.

24 Claims, 18 Drawing Sheets

APPARATUS AND METHOD OF RECORDING AND REPRODUCING VIDEO SIGNAL

This application is a continuation, of application Ser. No. 07/967,389 filed on Oct. 28, 1992, now abandoned.

BACKGROUND OF THE INVENTION

1. Field of the Invention

The present invention-relates to a video signal recording and reproducing apparatus for recording a video signal of a wide band on a magnetic tape such as a hi-vision video tape recorder (hereinafter referred to as the hi-vision VTR), and a method of recording and reproducing a video signal and, more particularly, to a VTR for recording a component signal, called a base band VTR.

2. Description of the Background Art

With recent development of image techniques, a test broadcasting of a hi-vision television signal has been started, and a real broadcasting is about to start in the very near future. Under such circumstances, a hi-vision VTR for recording and reproducing a video signal of the hi-vision broadcasting has also started to be put in the market place.

FIG. 9A is a block diagram showing a background art example of such a hi-vision VTR. In FIG. 9A, a symbol MT denotes a magnetic tape as a recording medium. This VTR includes a recording system and a reproduction system. The recording system includes A/D converters 1, 2 and 3 for converting a luminance signal Y and color difference signals $P_B$ and $P_R$ from an analog signal to digital data (hereinafter referred to as A/D-converting), a vertical filter and line-sequentially processing circuit 4 for line-sequentially processing digitized color difference signals $P_B$ and $P_R$ and converting the signals into one data $P_B/P_R$, and a shuffling circuit 37 for dividing A/D-converted luminance data Y and color difference data $P_B/P_R$ into data of channels CHA and CHB. This recording system further includes corresponding to the channels CHA and CHB, D/A converters 6 and 7, FM modulators 8 and 9, recording amplifiers 10 and 11, and magnetic head pairs 54 and 55.

The reproduction system includes corresponding to the channels CHA and CHB, reproduction amplifiers 14 and 15, FM demodulators 16 and 17, A/D converters 18 and 19, and time base correctors 38 and 39 for carrying out a time base correction. The reproducing system further includes a deshuffling circuit 40 for separating time-base corrected signals of the channels CHA and CHB into luminance data Y and color difference data $P_B/P_R$ (i.e., carrying out an opposite operation to that of the shuffling circuit 37), an interpolation filter 25, and D/A converters 26, 27 and 28.

In a recording operation, the luminance signal Y and the color difference signals $P_B$ and $P_R$ included in an input video signal are input to the A/D converters 1, 2 and 3, respectively, and then converted into digital data. A sampling frequency is approximately 44 MHz for the luminance signal Y, while it is approximately 11 MHz for the color difference signals $P_B$ and $P_R$. The A/D-converted luminance data Y is input intactly to the shuffling circuit 37. The color difference data $P_B$ and $P_R$, folding noises of which are first removed by the vertical filter are then processed line sequentially by the line sequential processing circuit. The line sequentially processed data are then converted into one data $P_B/P_R$. The signal $P_B/P_R$ is input to the shuffling circuit 37. The shuffling circuit 37 time-divides the luminance data Y and the color difference data $P_B/P_R$, then integrates the time-divided luminance data Y and color difference data $P_B$ and $P_R$, adds data of a negative polarity synchronizing signal and a burst signal to the integrated signal and generates two data of channels CHA and CHB. The details of the shuffling circuit 37 will be described later. The data of channels CHA and CHB are converted into analog signals by the D/A converters 6 and 7, respectively. The respective analog signals are FM-modulated by the respective FM modulators 8 and 9, then current-amplified by the respective recording amplifiers 10 and 11 and applied to the respective magnetic head pairs 54 and 55. The magnetic head pairs 54 and 55 record the amplified signals on a magnetic tape not shown. In practice, the magnetic head pair 54 includes two heads, magnetic heads A1 and A2 opposing by 180°. The magnetic head pair 55 similarly includes two heads, magnetic heads B1 and B2 (see FIG. 14 which will be referred to later.)

In a reproduction operation, the signal of channel CHA reproduced at the magnetic head pair 54 is amplified by the reproduction amplifier 14, while the signal of channel CHB reproduced at the magnetic head pair 55 is amplified by the reproduction amplifier 15. The amplified signals of channels CHA and CHB are input, respectively, to the FM demodulators 16 and 17, in which the signals are demodulated and a dropout is detected. The demodulated signals of channels CHA and CHB are converted into digital data by the A/D converters 18 and 19, respectively, and then input to the time base correctors 38 and 39, respectively. The time base correctors 38 and 39 correct a time base change of the input signals due to jitter or the like and also make a compensation of the dropout detected by the FM demodulators 16 and 17. After that, the time base correctors 38 and 39 output the data of channels CHA and CHB to the deshuffling circuit 40. The deshuffling circuit 40 carries out an opposite processing to that of the shuffling circuit 37. That is, the deshuffling circuit 40 removes data of the negative polarity synchronizing signal and the burst signal and separates the luminance data Y and the color difference data $P_B/P_R$ from the time base multiplexed data of channels CHA and CHB. The luminance data Y restored to the original by the deshuffling circuit 40 is converted into an analog signal by the D/A converter 26 and then output to a monitor or the like not shown. The line sequentially processed color difference data $P_B/P_R$ is alternately interpolated for each line by the interpolation filter 25 and divided into color difference data $P_B$ and $P_R$. These color difference signals $P_B$ and $P_R$ are converted into analog signals by the D/A converters 27 and 28, respectively, and then output to a monitor or the like not shown similarly to the aforementioned luminance signal Y.

FIG. 9B is a block diagram of the vertical filter and line sequential processing circuit 4 shown in FIG. 9A. With reference to FIG. 9B, the vertical filter and line sequential processing circuit 4 includes vertical filters 4A and 4B which are provided corresponding to color difference data $P_B$ and $P_R$ to remove any interferences caused by folding of the color difference data $P_B$ and $P_R$, and a switch circuit 6a for alternately selecting an input signal for each 1H.

The vertical filter 4A includes 1H delays 4a and 4b, adders 4c and 4f, and multipliers 4d and 4e. The vertical filter 4B includes 1H relates 5a and 5b, adders 5c and 5f, and multipliers 5d and 5e.

The switch circuit 6a has two input nodes and one output node. One of the input nodes is connected to an output of the adder 4f, the other input node is connected to an output of the adder 5f and the output node is connected to an input of the shuffling circuit 37.

In operation, undelayed color difference data $P_B$ and color difference data which is 2H delayed by the 1H delays 4a and 4b are added together by the adder 4c. The result of addition is attenuated to a ¼ level by the multiplier 4d. The color difference data $P_B$ which is 1H delayed by the 1H delay 4a is first attenuated to a ½ level by the multiplier 4e and then applied to the adder 4f. The adder 4f adds outputs of the multipliers 4d and 4e. The interferences caused by folding of the color difference data $P_B$ are thus removed. The vertical filter 4B removes interferences caused by folding of color difference data $P_R$ similarly to the vertical filter 4A. Consequently, the color difference data $P_B$ and $P_R$ that have passed the vertical filters 4A and 4B are 1H delayed from the luminance data Y. The color difference data $P_B$ and $P_R$ that have passed the vertical filters 4A and 4B are alternately selected by the switch circuit 6a and converted into one color difference data $P_B/P_R$.

The shuffling processing will now be described. FIG. 10 is a block diagram showing structure of a general shuffling circuit. This shuffling circuit 37 includes switch circuits 41 and 42, field memories 43 and 44, memory controllers 45 and 46, output switch circuits 47a and 47b, and ROMs 48 and 49 for generating a synchronizing signal and a burst signal. Each of the switch circuits 41 and 42 has two input terminals and one output terminal. One of the input terminals is supplied with luminance data Y, and the other input terminal is supplied with color difference data $P_B/P_R$. The output terminal of the switch circuit 41 is connected to an input of the field memory 43, while the output terminal of the switch circuit 42 is connected to an input of the field memory 44. The field memory 43 includes two memories 43a and 43b for each storing a ½ field. During the period that one memory 43a is brought into a write state, the other memory 43b is brought into a read state. The field memory 44 includes two memories 44a and 44b similarly to the field memory 43. The memory controller 45 controls writing and reading of the field memory 43 and also controls addresses. The memory controller 46 controls writing and reading of the field memory 44 and also controls addresses. Further, the memory controllers 45 and 46 control reading of the sync and burst generating ROMs 48 and 49.

In operation, the luminance data Y and the color difference data $P_B/P_R$ input to the shuffling circuit 37 are input to the switch circuits 41 and 42. The switch circuits 41 and 42 alternately switch the input data for each one horizontal period (hereinafter referred to as 1H) and output the switched input data to the field memories 43 and 44 at the succeeding stage. Thus, when an output of the switch circuit 41 is the luminance data Y, for example, an output of the switch circuit 42 is the color difference data $P_B/P_R$. Video data of one field from the switch circuits 41 and 42 is stored into one memory of each of the field memories 43 and 44, i.e., memories 43a and 44a. Subsequent video data of one field is stored into the other memory of each of the field memories 43 and 44, i.e., memories 43b and 44b. At the same time, the data stored in advance into one memory of each of the field memories 43 and 44 are read. This state is alternately repeated. The video data read from the field memories 43 and 44 and the sync and burst data read from the sync and burst generating ROMs 48 and 49 are appropriately switched by the switch circuits 47a and 47b, respectively, and then output as data of channels CHA and CHB.

FIG. 11 shows mapping of the field memories 43 and 44. A description will now be made with reference to FIG. 11 as to how the video data comprised of the luminance data Y and the color difference data $P_B/P_R$ is specifically time-divided and integrated in the background art example. FIG. 11 merely illustrates video data of one field. Referring to FIG. 11, a CHA memory corresponds to one of the two memories 43a and 43b of the field memory 43, while a CHB memory corresponds to one of the two memories 44a and 44b of the field memory 44. Each ½ field memory is divided into two segments, a first segment and a second segment. Data shown on the left part of FIG. 11 are luminance data Y and color difference data $P_B/P_R$ to be input to the switch circuits 41 and 42. The color difference data $P_B/P_R$ is advanced by 1H from the luminance data Y. With two types of data thus input, color difference data $P_R1$ is written in a predetermined location (address) of the first segment of the CHA memory during the first 1H. During the next 1H, color difference data $P_B2$ is written in a predetermined location of the first segment of the CHB memory, and at the same time, luminance data Y1 is written in the next location of the color difference data $P_R1$ of the CHA memory. In this manner, a new 1H of the CHA memory which is time-base multiplexed video data ($P_R1$, Y1) can be provided. Further, during the next 1H, color difference data $P_R3$ is written in a predetermined location of the second segment of the CHA memory and, at the same time, luminance data Y2 is written in the next location of the color difference data $P_B2$ of the CHB memory. In this manner, a new 1H of the CHB memory which is time-base multiplexed video data ($P_B2$, Y2) can be provided. Further, during the next 1H, color difference data $P_B4$ is written in a predetermined location of the second segment of the CHB memory, and at the same time, luminance data Y3 is written in the next location of the color difference data $P_R3$. With each data alternately written into the CHA memory and the CHB memory and in the first and second segments, the shuffling is completed.

As described above, in the background art example, only color difference signals $P_R$ and only luminance signals of odd H are stored in the CHA memory. Data thus recorded are thinned out to two segments of the first and second segments. Data of the same segment of the channels CHA and CHB are read simultaneously and read in the order of the first segment and the second segment.

In order to carry out such shuffling, there must be a time difference of odd H between the luminance data Y and the color difference data $P_B/P_R$ input to the shuffling circuit 37. This is because it is possible to write different data into one memory at a time.

While the color difference data $P_B/P_R$ is advanced by 1H from the luminance data Y in the example shown in FIG. 11, the same processing as above is available even if the color difference data is advanced by 3H from the luminance data, or even if the luminance data is advanced by 1H or 3H from the color difference data. In practice, as shown in FIG. 9B, it is common that a color difference signal is delayed by 1H from a luminance signal because of a process in which the color difference signal is processed by the vertical filter and line sequential processing circuit 4.

FIG. 12 is a diagram showing an output signal of the first segment output from the D/A converters 6 and 7 shown in FIG. 9A. In FIG. 12, CHA denotes output data of the D/A converter 6, and CHB denotes output data of the D/A converter 7. The D/A converter 6 is alternately supplied with data of the first segment of the channel CHA and data of the second segment of the channel CHA from the shuffling circuit 37. The data of each segment includes a synchronizing signal and a burst signal output by the sync and burst generating ROM 48 (FIG. 10). The D/A converter 7 is alternately supplied with data of the first segment of the channel CHB and data of the second segment of the channel CHB from the shuffling circuit 37. The data of each segment includes a synchronizing signal and a burst signal similar to the D/A converter 6.

FIG. 13 is a diagram showing a relationship between a format of a recording signal of one field to be supplied to magnetic heads and rotation of a drum. FIG. 13 shows a state where the first segment is first output and the second segment is then output. FIG. 14 shows arrangement of magnetic heads on a drum; and FIG. 15 shows a recording pattern provided when recording is made on a magnetic tape by the magnetic heads of FIG. 14. With reference to FIG. 14, magnetic head pairs 54 and 55 are provided at opposing positions by 180° on a rotating drum 100. The magnetic head pair 54 has magnetic heads A1 and B1 which are arranged in proximity and have different azimuth angles. The magnetic head pair 55 has magnetic heads A2 and B2 which are arranged in proximity and have different azimuth angles. The magnetic heads A1 and A2 have the same azimuth angle, while the magnetic heads B1 and B2 have the same azimuth angle.

The first segment of the channel CHA of the recording signal shown in FIG. 13 is recorded on the magnetic tape by the magnetic head A1, while the first segment of the channel CHB is recorded on the magnetic tape by the magnetic head B1. The second segment of the channel CHA is recorded on the magnetic tape by the magnetic head A2, while the second segment of the channel CHB is recorded on the magnetic tape by the magnetic head B2. This phenomenon is represented as a conventional recording pattern in FIG. 15. As shown in FIG. 15, one segment of one channel corresponds to one track. Thus, the tracks are denoted with the same reference characters as those of their corresponding magnetic heads.

In operation, during the first period that the rotating drum 100 rotates through 180°, the magnetic heads A1 and B1 trace from the lower right to the upper left of the magnetic tape and the first segment is recorded. During the next rotation off 180°, the magnetic heads A2 and B2 record the second segment. That is, with one rotation of the drum 100, a video signal of one field is recorded on four tracks on the magnetic tape. At this time, the magnetic heads A1 and B1 record the signal on adjacent two tracks at a time, and the magnetic heads A2 and B2 record the signal on the tracks A2 and B2 at a time so as to be adjacent to the track B1.

A description will now be made on a dropout compensation in the video signal recording and reproducing apparatus of background art with reference to FIGS. 13 and 16. FIG. 16 is a block diagram of the time base corrector circuits 38 and 39 serving also as dropout compensation circuits, showing two channels. Data of the channel CHA shown in FIG. 16 is output from A/D converter 18, while data of the channel CHB is output from the A/D converter 19. A dropout pulse DOPA is output from the FM demodulator 16, while a dropout pulse DOPB is output from the FM demodulator 17. With reference to FIG. 16, this time base corrector circuit 38 includes a line memory 50 for storing one line of the data of the channel CHA, and a memory controller 52 for controlling the line memory 50. The time base corrector circuit 39 includes a line memory 51 for recording one line of the data of the channel CHB, and a memory controller 53 for controlling the line memory 51.

The time base correcting operation of the time base corrector circuits 38 and 39 will now be described. The data of the channels CHA and CHB are reproduced by the reproduction amplifiers 14 and 15, then demodulated by the FM demodulators 16 and 17, A/D-converted by the A/D converters 18 and 19 and applied to the line memories 50 and 51, respectively. Each data has a time base change due to irregularity of the rotation of the drum or expansion and contraction of the tape; however, those data are written into the line memories 50 and 51 by a clock signal having a time base change generated by a PLL circuit or the like not shown. The written data are read by a clock signal having no time base change. This enables the time base correcting operation, i.e., implementation of the time base correctors. The writing and reading of the line memories 50 and 51 is carried out by the memory controllers 52 and 53.

The dropout compensating operation of the time base corrector circuits 38 and 39 will now be described. When detecting a dropout, the FM demodulator 16 outputs a dropout detecting signal DOPA to the time base corrector 38. The dropout detecting signal DOPA is input to the memory controller 52. The memory controller 52 responds to the dropout detecting signal DOPA to stop the data writing operation of the line memory 50. As a result, previous data remains intact in the line memory 50. Since the memory controller 52 carries out a reading operation normally, the dropout portion is replaced by data of the previous horizontal period H, whereby the dropout compensating operation is completed. For example, assume that there is a dropout in video data $(P_R5, Y5)$ in FIG. 13. Then, the time base corrector circuit 38 makes a compensation by the data stored during the previous horizontal period H, and hence, this dropout portion is replaced with video data $(P_R1, Y1)$. While the dropout compensating operation of the channel CHA has been described above, the same dropout compensating operation is applied to the channel CHB.

When there is a dropout in the video data $(P_R5, Y5)$ of FIG. 13, conventionally, the time base corrector circuit 38 replaces the video data $(P_R5, Y5)$ with the video data $(P_R1, Y1)$. However, the video data $(P_R1, Y1)$ and $(P_R5, Y5)$ are apart from each other by 4H and are thus less correlated with each other. Data which is most correlative with the video data $(P_R5, Y5)$ is video data $(P_R3, Y3)$ or $(P_R7, Y7)$. However, the video data $(P_R3, Y3)$ or $(P_R7, Y7)$ is in the second segment. Thus, if the video data $(P_R5, Y5)$ is replaced with the video data $(P_R3, Y3)$ or $(P_R7, Y7)$, it must be waited until the drum 100 rotates through 180°, resulting in the problem that a considerably large memory must be provided in order to hold the data during the rotation of 180°.

In addition, in the recording system of background art, only signals $P_R$ of a red type are collected in the color difference signal of the channel CHA, and only signals $P_B$ of a blue type are collected in the color difference signal of the channel CHB as shown in FIG. 13. In this case, if there is a difference in characteristics between a circuit for recording and reproducing on the basis of data of the channel CHA and a circuit for recording and reproducing on the basis of data of the channel CHB, it appears visually that an image has improper or poor hues. This problem occurs often in a VTR with 2 channel recording.

SUMMARY OF THE INVENTION

One object of the present invention is to make a dropout compensation with most correlative data in a hi-vision VTR.

Another object of the present invention is to prevent improper or poor hues due to a difference in characteristics between channels in a hi-vision VTR.

Briefly, a video signal recording and reproducing apparatus in accordance with the present invention is a video signal recording and reproducing apparatus for dividing one field of a video signal into first and second channels and recording the divided video signals on a recording medium, the apparatus including a plurality of A/D converters, a video signal output circuit and a recorder. Each A/D converter A/D-converts a luminance signal and color difference signals of first and second types included in a video signal at different sampling frequencies. The video signal output circuit divides one field of the luminance signal and the first and second types of color difference signals, which are A/D-converted by each A/D converter, into video signals of first and second channels each including a first segment including the first type of color difference signal and a second segment including the second type of color difference signal, and then outputs the divided video signals. The recorder records the first segments of the video signals of the first and second channels from the video signal output circuit onto at least two tracks on the recording medium with spacings of one track, while it records the second segments of the video signals of the first and second channels from the video signal output circuit onto the recording medium so as to interpose one of the tracks of the first segments recorded already.

In operation, since the video signals of the first and second channels include the first and second types of color difference signals, the color signal of the same type is not included in one of the channels unlike the background art example. It is thus possible to prevent an image having visually improper or poor hues even if there are different circuit characteristics between the two channels.

The signals recorded on the recording medium are aligned in the order of the first segment of the first channel, the first segment of the second channel, the second segment of the first channel and the second segment of the second channel. Accordingly, in accordance with the present invention, the same recording format as in the background art example can be provided. Consequently, compatibility is retained between the present invention and the background art.

A video signal recording and reproducing apparatus according to another aspect of the present invention includes a plurality of A/D converters, a video signal output circuit, a recorder, a demodulator, a dropout compensation circuit and a reproduction circuit. Each A/D converter A/D-converts a luminance signal and first and second types of color difference signals included in a video signal at different sampling frequencies. The video signal output circuit divides one field of the luminance signal and the first and second types of color difference signals, which are A/D-converted by each A/D converter, into video signals of first and second channels each including a first segment including the first type of color difference signal and a second segment including the second type of color difference signal, and then outputs the divided video signals. The recorder records the first segments of the video signals of the first and second channels from the video signal output circuit onto at least two tracks on a recording medium with spacings of one track, while it records the second segments of the video signals of the first and second channels from the video signal output circuits onto the recording medium so as to interpose one of the tracks of the first segments recorded already. The demodulator demodulates the video signals of the first and second channels recorded on the recording medium, and generates a control signal for compensating for a dropout of the demodulated video signals of the first and second channels. The dropout compensation circuit responds to the control signal from the demodulator to compensate for the video signal of one of the channels demodulated by the demodulator with the demodulated video signal of the other channel. The reproduction circuit reproduces a luminance signal and color difference signals of first and second types from the video signals of the first and second channels which are demodulated by the demodulator or compensated by the dropout compensation circuit.

In operation, since the same segment of the first and second channels includes the same type of color difference signal, a video signal of the same segment of the other channel can be employed as a signal for compensating for a dropout. Accordingly, a dropout compensation can be made by a video signal which has the smallest time difference from a signal of a dropout period, i.e., the most strong correlation with the signal of the dropout period. Consequently, a feeling of incompatibility provided when there is a dropout in a reproduced image can be decreased as compared to that in the background art.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

An embodiment of the present invention will now be described with reference to the drawings.

Figure 1A:
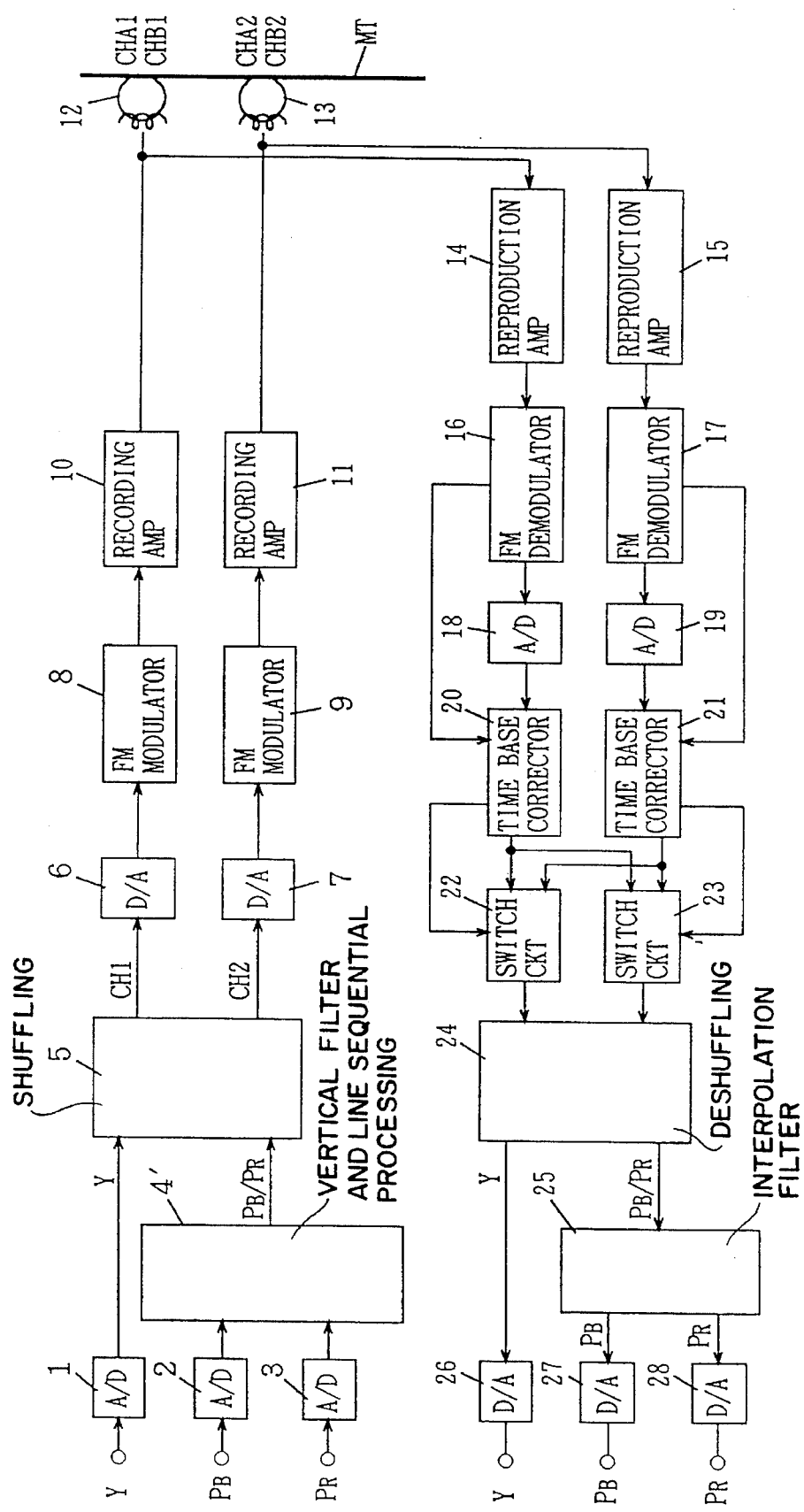
FIG. 1A is a block diagram showing one embodiment of the present invention.
Figure 9A:
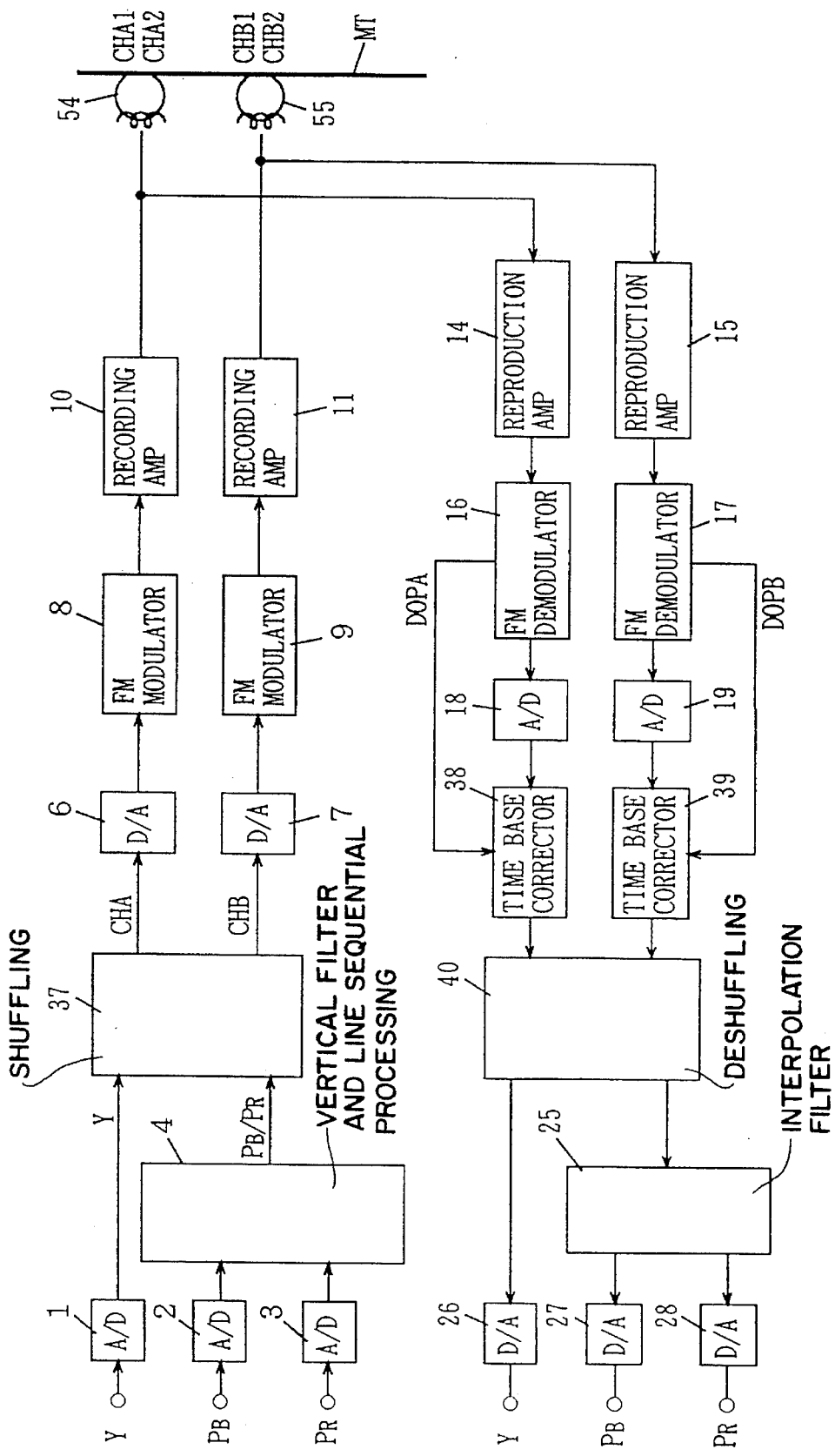
FIG. 9A is a block diagram of a hi-vision VTR of background art.

FIG. 1A is a block diagram showing one embodiment of the present invention. This VTR is different from the VTR of FIG. 9A in that: (1) a recording system includes a vertical filter and line sequential processing circuit 4' for setting a time difference between luminance data Y and color difference data $P_B/P_R$ to be an even H, a shuffling circuit 5 for setting color difference data $P_R$ in first segments of channels CH1 and CH2 and color difference data $P_B$ in second segments of the channels CH1 and CH2, a magnetic head pair 12 for recording the first segments of the channels CH1 and CH2 on a magnetic tape, and a magnetic head pair 13 for recording the second segments of the channels CH1 and CH2 on the magnetic tape; and (2) a reproduction system additionally includes switch circuits 22 and 23, and a deshuffling circuit 24 corresponding to the shuffling circuit 5 of the recording system. The other circuits are the same as those of FIG. 9A and hence denoted with the same reference characters as those of FIG. 9A, and a description thereof will not be repeated here.

In operation, an input luminance signal Y and color difference signals $P_B$ and $P_R$ are A/D-converted. The color difference signals are line sequentially processed by the vertical filter and line sequential processing circuit 4' and converted into one color difference signal $P_B/P_R$, and thereafter, the signal is input to the shuffling circuit 5. At this timer a time difference of even H is provided between the luminance data Y and the color difference data $P_B/P_R$ input to the shuffling circuit 5. While the details of the shuffling circuit 5 will be described later, video data which are time-divided and integrated by the shuffling circuit 5 are output as data of the channels CH1 and CH2. (The channels CHA and CHB are employed in the background art example.) Those two channel data are D/A-converted, FM-modulated, current-amplified by recording amplifiers 10 and 11 and then recorded on a magnetic tape MT as a recording medium by the magnetic head pairs 12 and 13, similarly to the background art. The magnetic head pair 12 has magnetic heads A1 and B1. The magnetic head pair 13 has magnetic heads A2 and B2. The details of the magnetic head pairs 12 and 13 will be described later with reference to FIG. 5.

In reproduction, the same process as that in the background art is applied until reproduction data are input to time base corrector circuits 20 and 21. Outputs of the time base corrector circuits 20 and 21 are connected to both inputs of each of switch circuits 22 and 23. The switch circuits 22 and 23 are controlled by the time base corrector circuits 20 and 21, so that one of the outputs of the time base corrector circuits 20 and 21 is selected. Further, data of one channel can be switched to data of the other channel and then can be output. Outputs of the switch circuits 22 and 23 are input to the deshuffling circuit 24, in which an opposite processing to that of the shuffling circuit 5 is carried out and the processed output is output as luminance data Y and color difference data $P_B/P_R$. A subsequent processing is identical to that described in the background art.

Figure 1B:
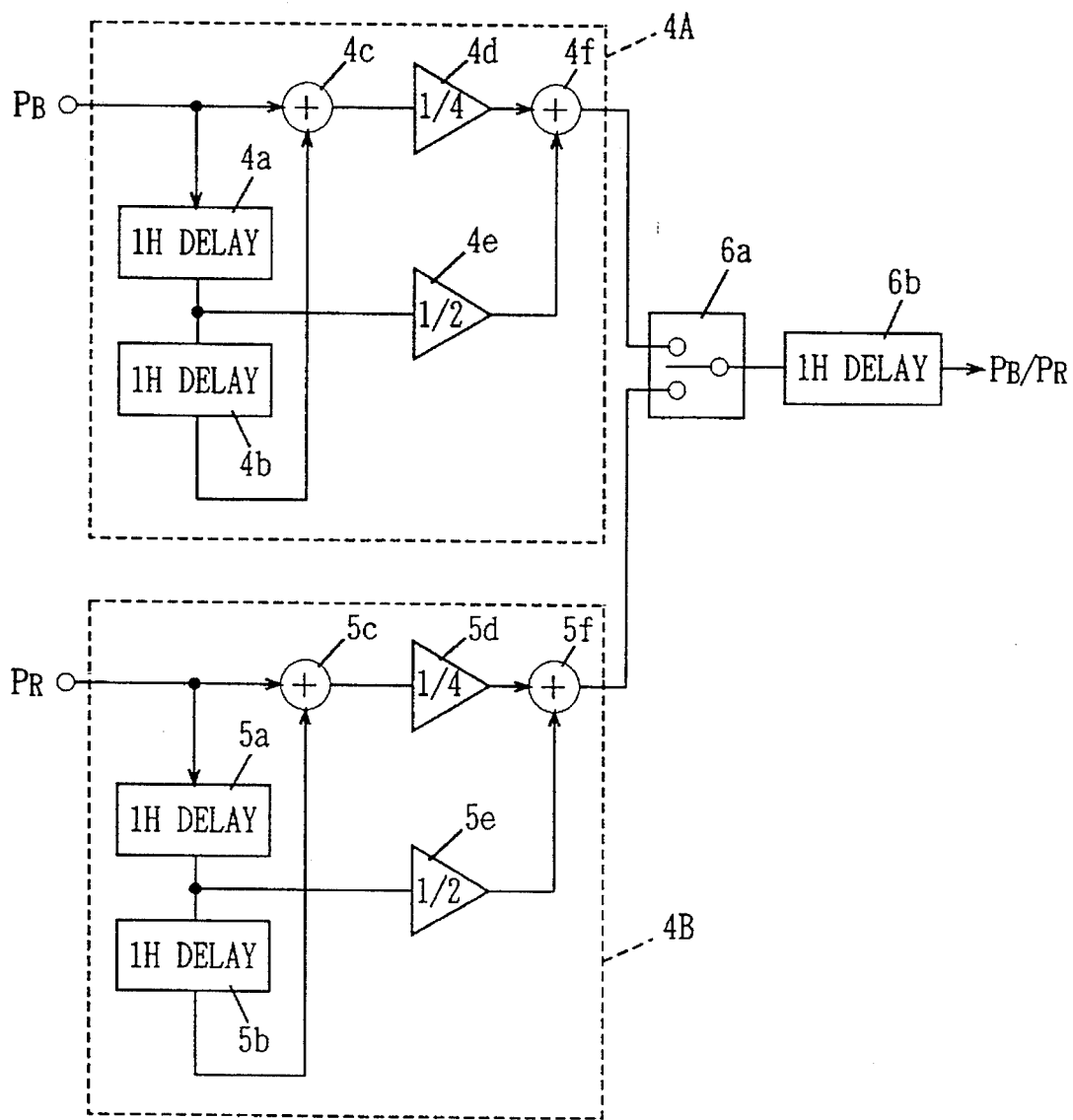
FIG. 1B is a block diagram showing one example of a vertical filter and line sequential processing circuit shown in FIG. 1A.
Figure 9B:
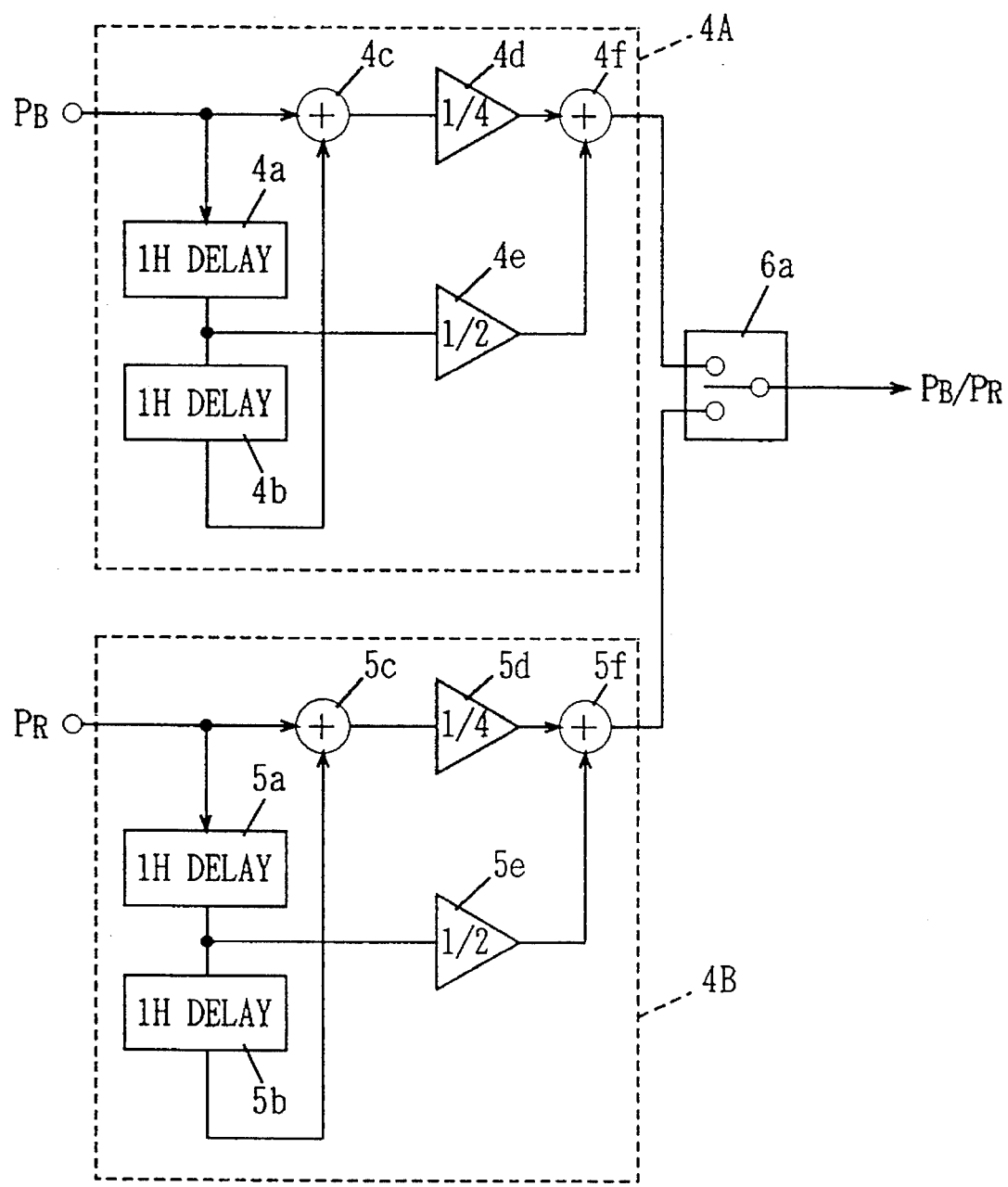
FIG. 9B is a block diagram showing one example of a vertical filter and line sequential processing circuit shown in FIG. 9A.

FIG. 1B is a block diagram showing one example of the vertical filter and line sequential processing circuit 4' shown in FIG. 1A. The vertical filter and line sequential processing circuit 4' shown in FIG. 1B is different from the vertical filter and line sequential processing circuit 4 shown in FIG. 9B in that a 1H delay 6b is connected to an output of a switch circuit 6a.

In operation, the 1H delay 6b delays by 1H the color difference data $P_B/P_R$ line sequentially processed by the switch circuit 6a. This makes it possible to delay the color difference data $P_B/P_R$ by 2H from the luminance data Y. Thus, the luminance data Y and the color difference data $P_B/P_R$, the time difference of which is 2H are applied to the input of the shuffling circuit 5.

While the color difference data $P_B/P_R$ is delayed by 2H from the luminance data Y in the circuit of FIG. 1B, the color difference data $P_B/P_R$ may be advanced by an even H from the luminance data Y. In this case, the line sequential processing circuit 4 is structured as in FIG. 9B and 1H delays of (2n+1) stages are provided between the A/D converter 1 and the shuffling circuit 5 of FIG. 1A, thereby delaying an output of the A/D converter 1 by (2n+1) H.

Figure 2:
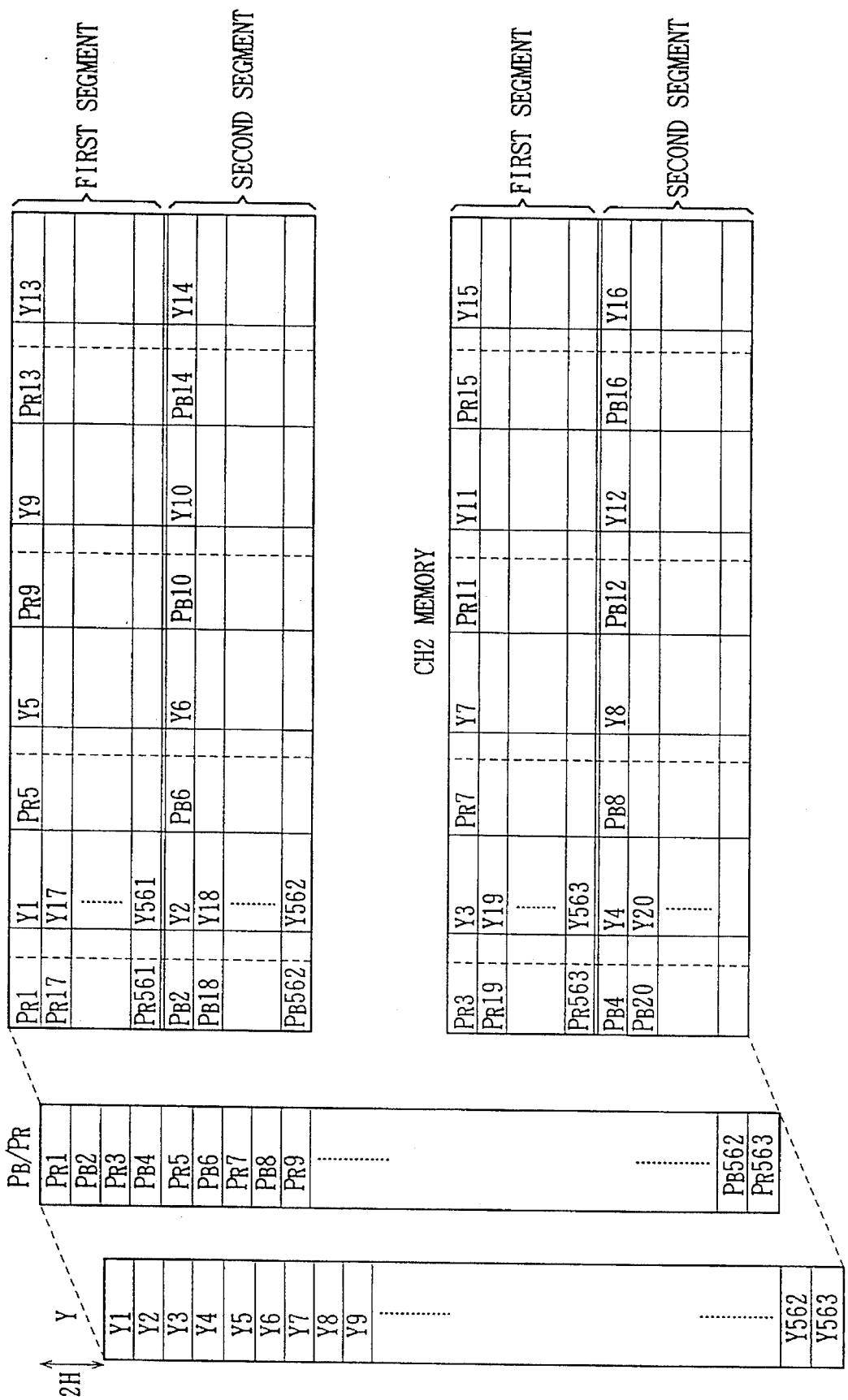
FIG. 2 is a diagram for use in explaining memory mapping during shuffling.
Figure 10:
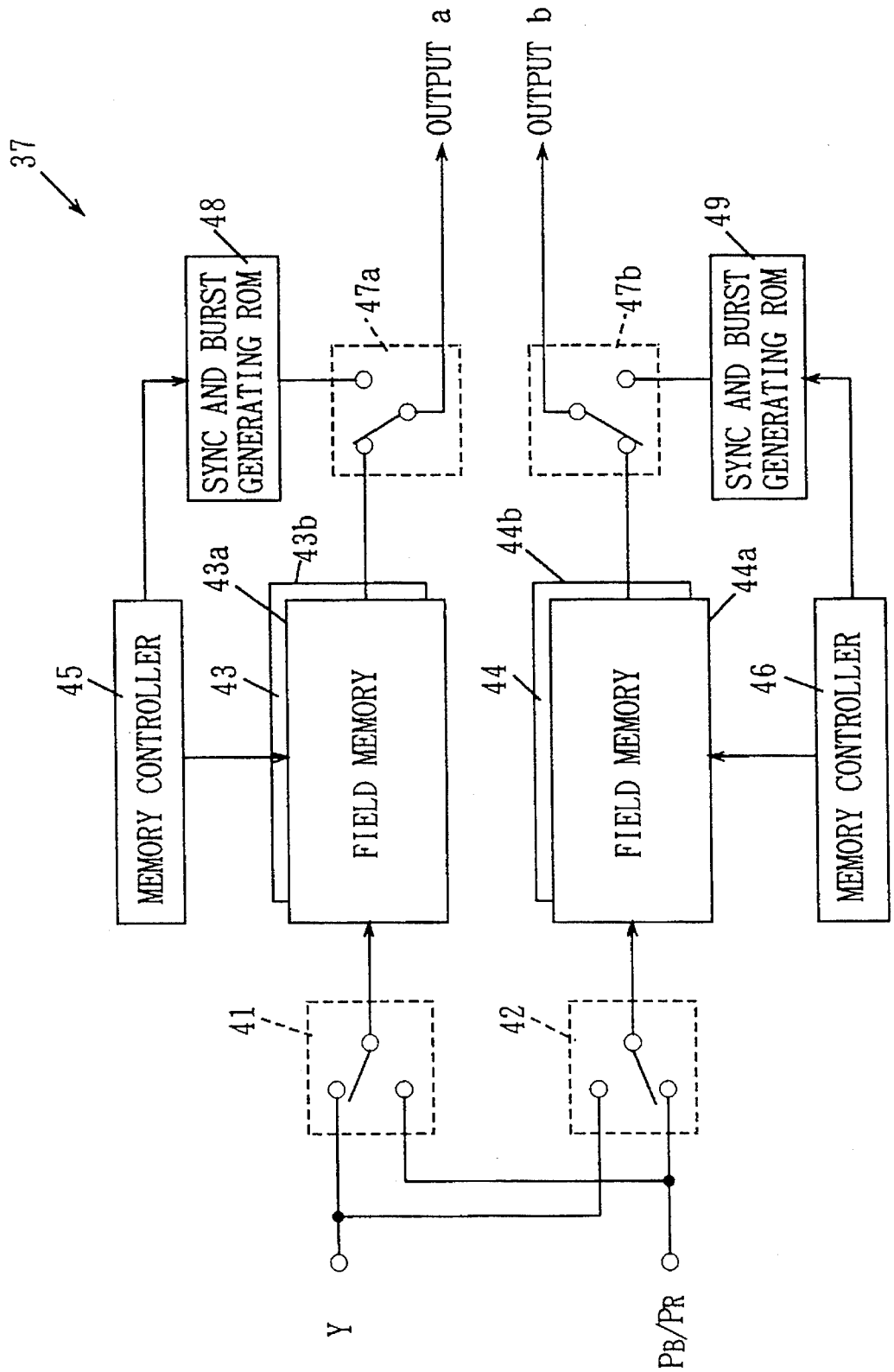
FIG. 10 is a block diagram showing structure of a shuffling circuit of FIG. 8.
Figure 11:
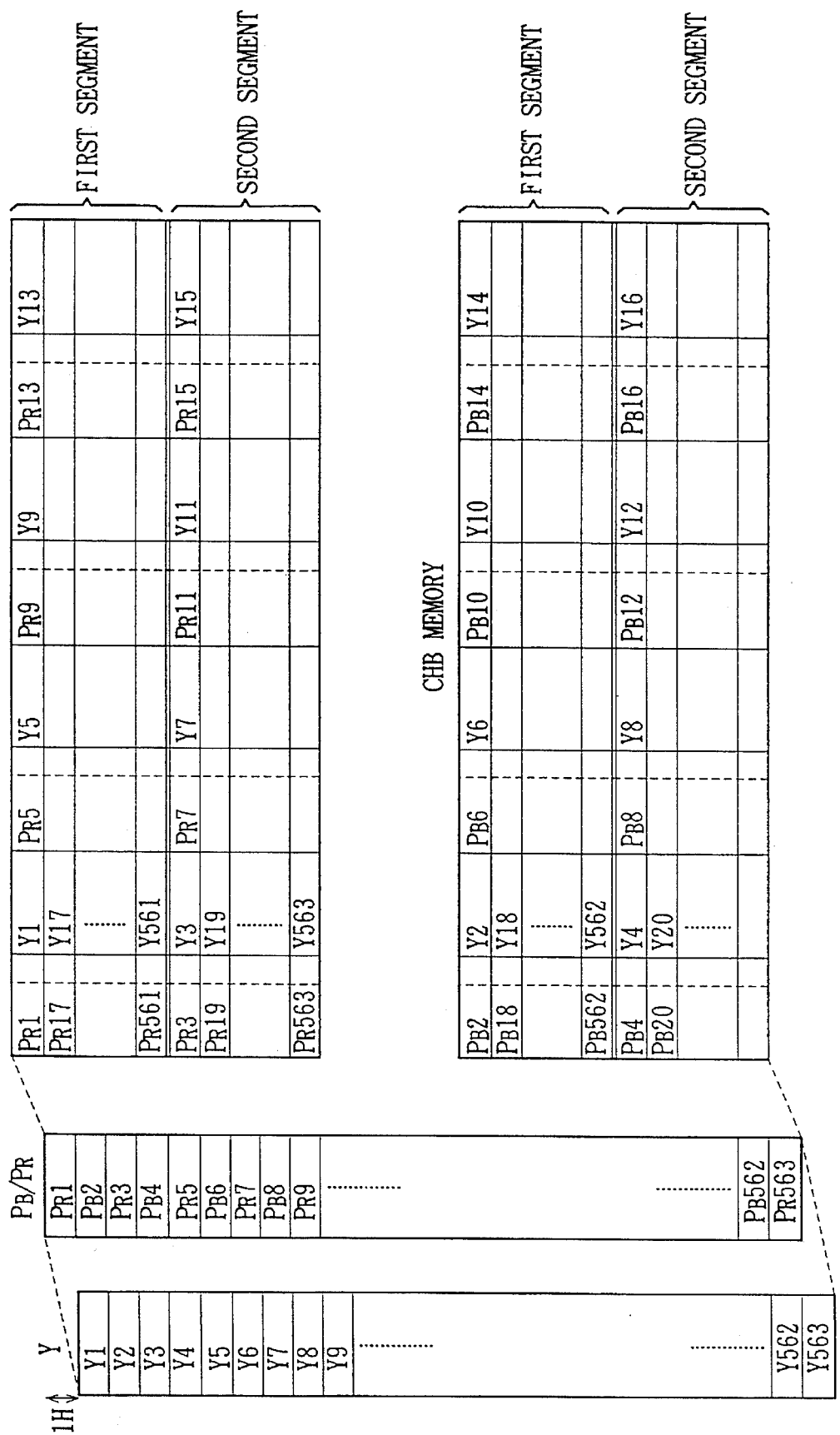
FIG. 11 is a diagram for use in explaining memory mapping in a shuffling circuit of background art.
Figure 12:
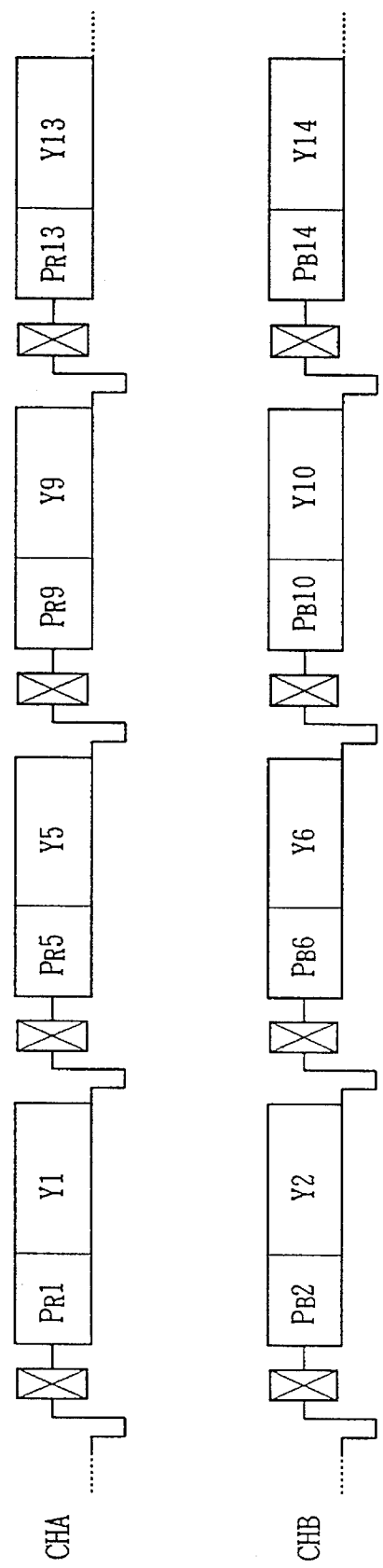
FIG. 12 is a diagram showing an analog waveform of recording signals of background art.
Figure 13:
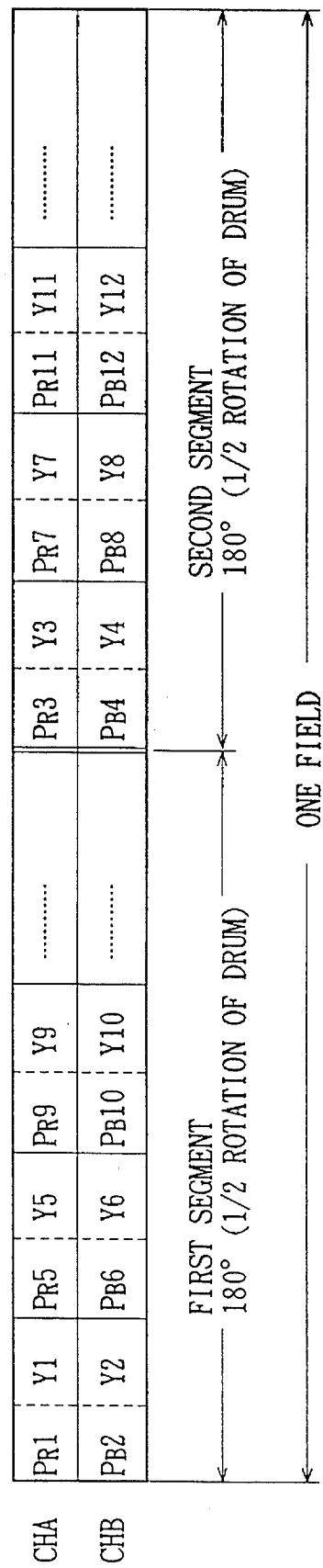
FIG. 13 is a diagram showing arrangement of recording signals and construction of segments in one field according to background art.
Figure 14:
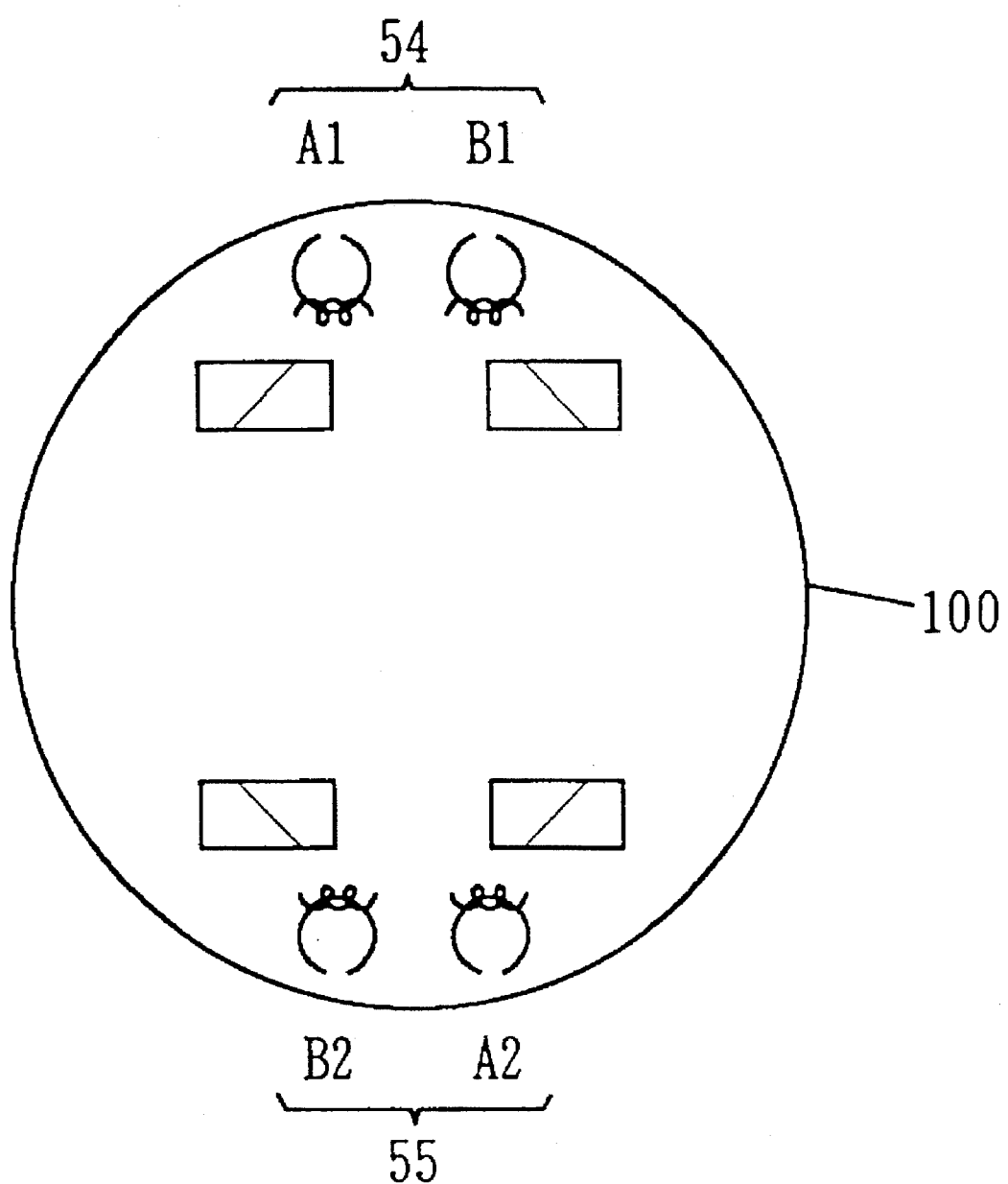
FIG. 14 is a diagram for use in explaining arrangement of heads on a drum of background art.

The shuffling circuit of FIG. 1A will now be described in detail with reference to FIG. 2. A basic structure of the shuffling circuit 5 is identical to that of the background art of FIG. 10. FIG. 2 shows a memory map during shuffling similarly to FIG. 11. Now, assume that the luminance data Y is delayed by 2H from the color difference data $P_B/P_R$. First, color difference data $P_R1$ is written in a predetermined position of the first segment of a CH1 memory corresponding to the channel CH1. Then, color difference data $P_B2$ is written in a predetermined position of the second segment of the CH1 memory. Next, luminance data Y1 is written in the next position of the color difference data $P_R1$. At the same time, color difference data $P_R3$ is written in a predetermined position of the first segment of a CH2 memory corresponding to the channel CH2. Then, luminance data Y2 is written in the next position of the color difference data $P_B2$, and simultaneously, color difference data $P_B4$ is written in a predetermined position of the second segment of the CH2 memory. With this operation repeated sequentially, a shuffling operation is completed.

While the description has been given on the case where the luminance signal Y is delayed by 2H in the example of FIG. 2, the color difference signal may be delayed from the luminance signal. Like the background art example, any of the luminance signal and the color difference signal may be delayed. Further, the time difference between the luminance data Y and the color difference data $P_B/P_R$ may be 2nH (n is a natural number).

Figure 3:
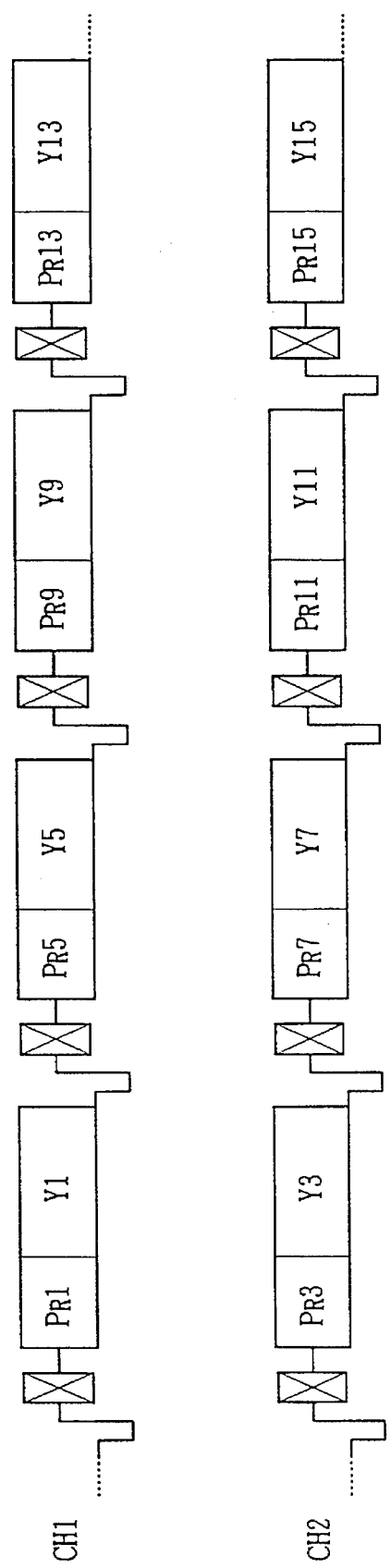
FIG. 3 is a diagram showing an analog waveform of recording signals of the present invention.

FIG. 3 shows which recording signal the signal output from the shuffling circuit of this embodiment changes to. FIG. 3 shows a first part of the D/A-converted first segment. Like the background art, a negative polarity synchronizing signal and a burst signal are added.

Figure 4:
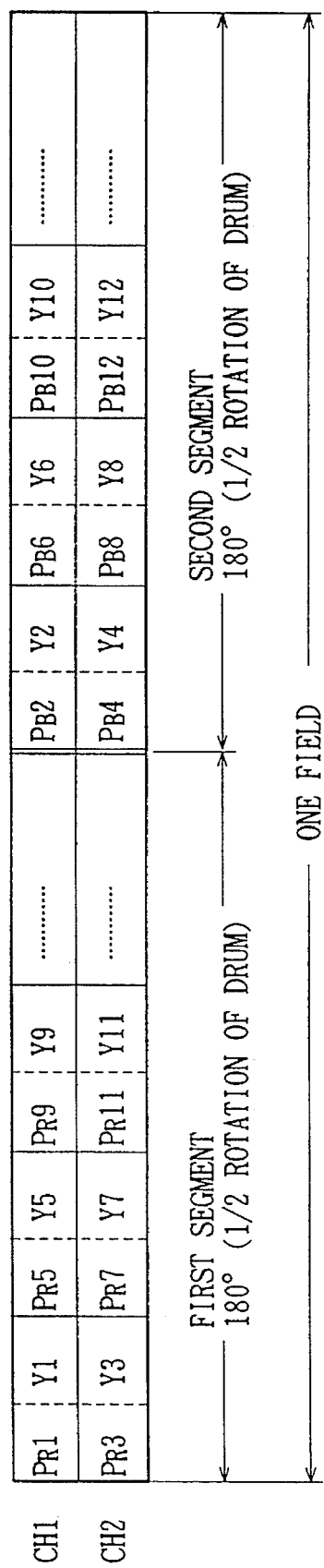
FIG. 4 is a diagram showing arrangement of recording signals and construction of segments in one field.

FIG. 4 is a diagram showing how recording signals of the channels CH1 and CH2 are aligned in one field. Color difference signals $P_R$ are collected in the first segments of the channels CH1 and CH2, while color difference signals $P_B$ are collected in the second segments thereof. That is, this embodiment differs from the background art in that there is a substitution between the first segment of the channel CH2 and the second segment of the channel CH1.

Figure 5:
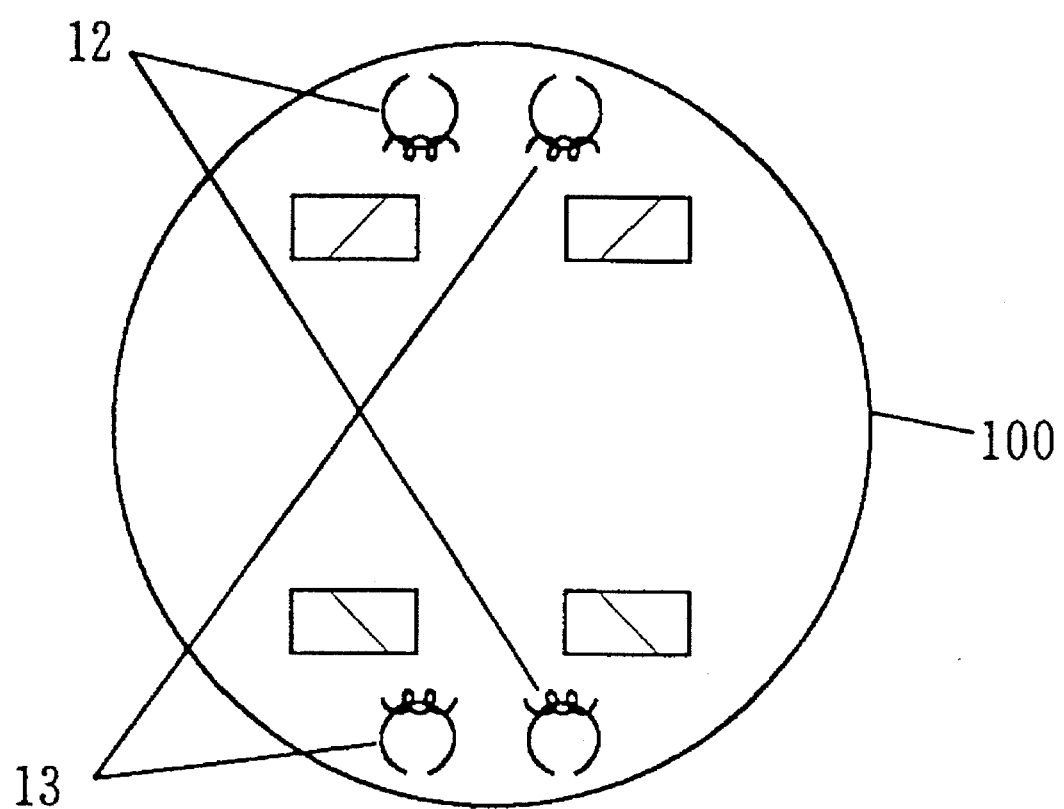
FIG. 5 is a diagram for use in explaining arrangement of heads on a drum.
Figure 6:
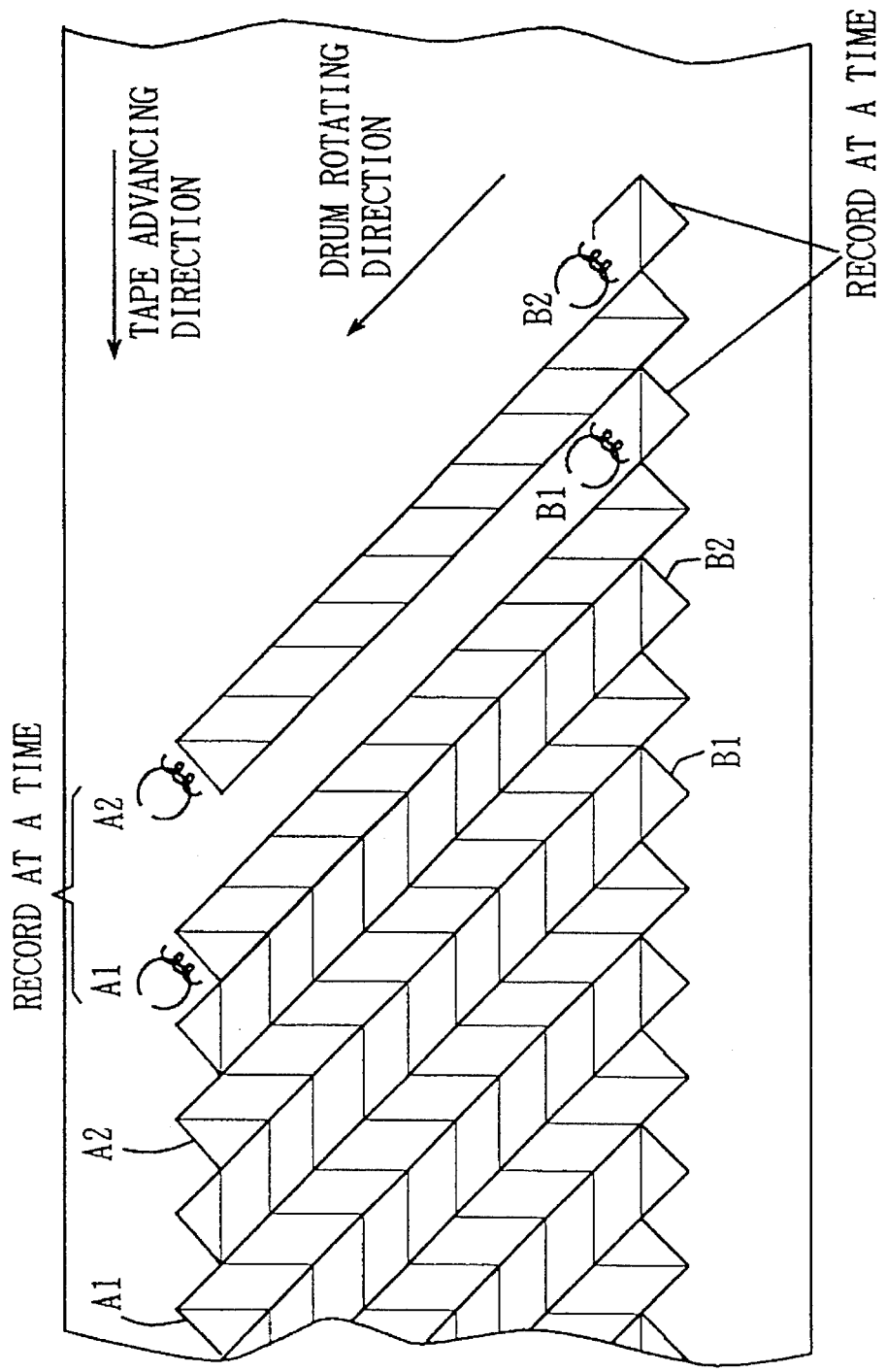
FIG. 6 is a diagram showing a recording pattern on a magnetic tape.

In the present invention, a head arrangement is devised for recording/reproduction while maintaining compatability between the signals of the channels CH1 and CH2 and the signals of background art. This devisal is described with reference to FIG. 5. FIG. 5 is a diagram showing arrangement of magnetic heads. Magnetic heads A1 and A2 are spaced apart by one track from each other and disposed in proximity on a rotating drum 100. These magnetic heads have the same azimuth angle. On the other hand, magnetic heads B1 and B2 are spaced apart by one track from each other and disposed in proximity at a position opposing by 180° to the magnetic heads A1 and A2. The magnetic heads B1 and B2 have the same azimuth angle. The azimuth angle of the magnetic heads A1 and A2 is made different from that of the magnetic heads B1 and B2. FIG. 6 shows a recording pattern provided when data are recorded on the magnetic tape by the magnetic heads thus arranged.

In operation, at the first 180°, the magnetic heads A1 and A2 trace video signals of the first segments of the CH1 memory and the CH2 memory with a spacing of one track, and for the next 180°, the magnetic heads B1 and B2 trace video signals of the second segments of the CH1 memory and the CH2 memory with a spacing of one track. During this period, the magnetic head B1 traces a part between the parts traced by the magnetic heads A1 and A2. Accordingly, the magnetic heads B1 and B2 make tracing so as not to overwrite on the track traced by the magnetic head A2.

Figure 15:
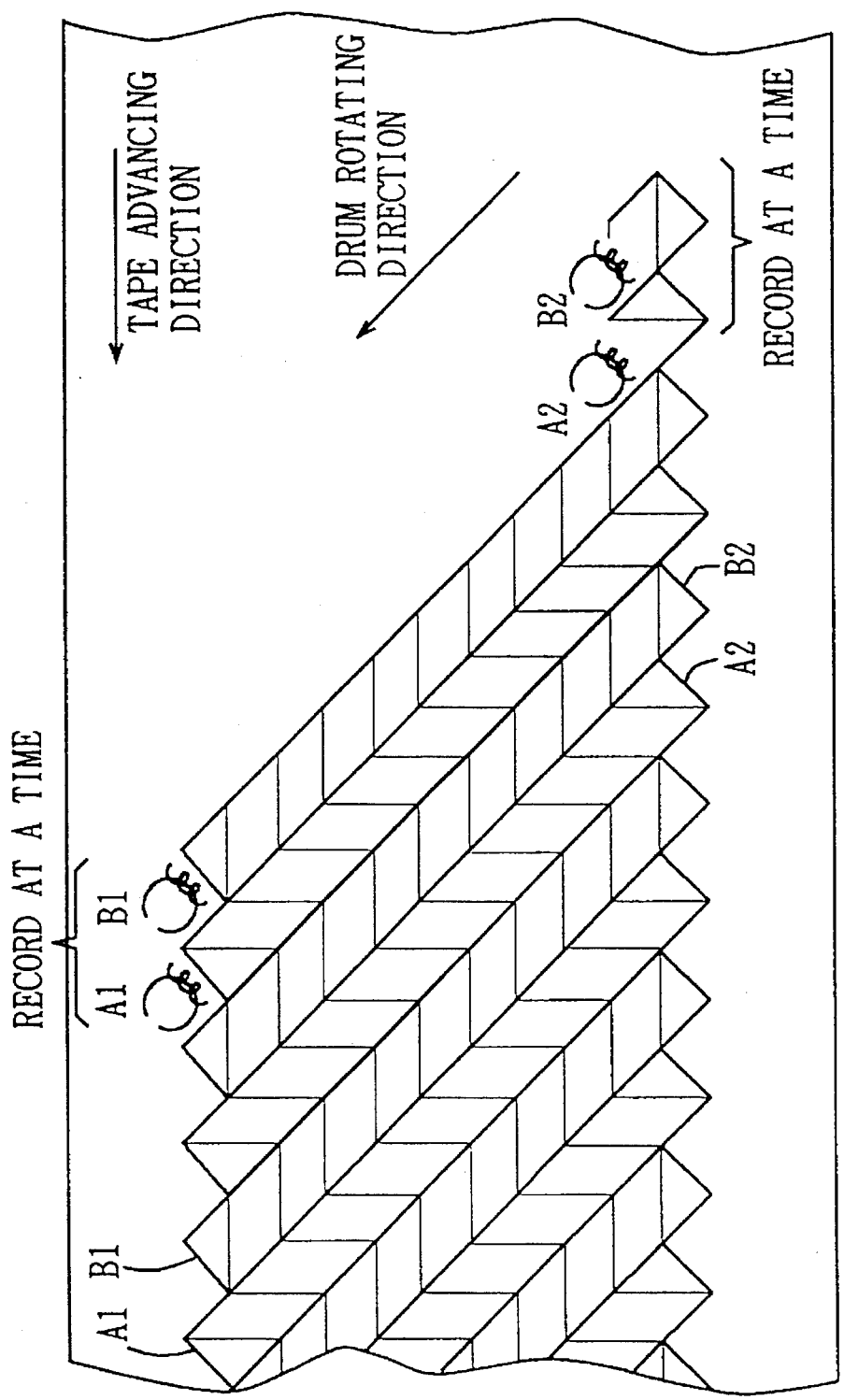
FIG. 15 is a diagram showing a recording pattern on a magnetic tape of background art.

Thus, a recording pattern which is compatible with the recording pattern of the background art can be made by recording on the magnetic tape. (see FIGS. 6 and 15.)

Figure 7:
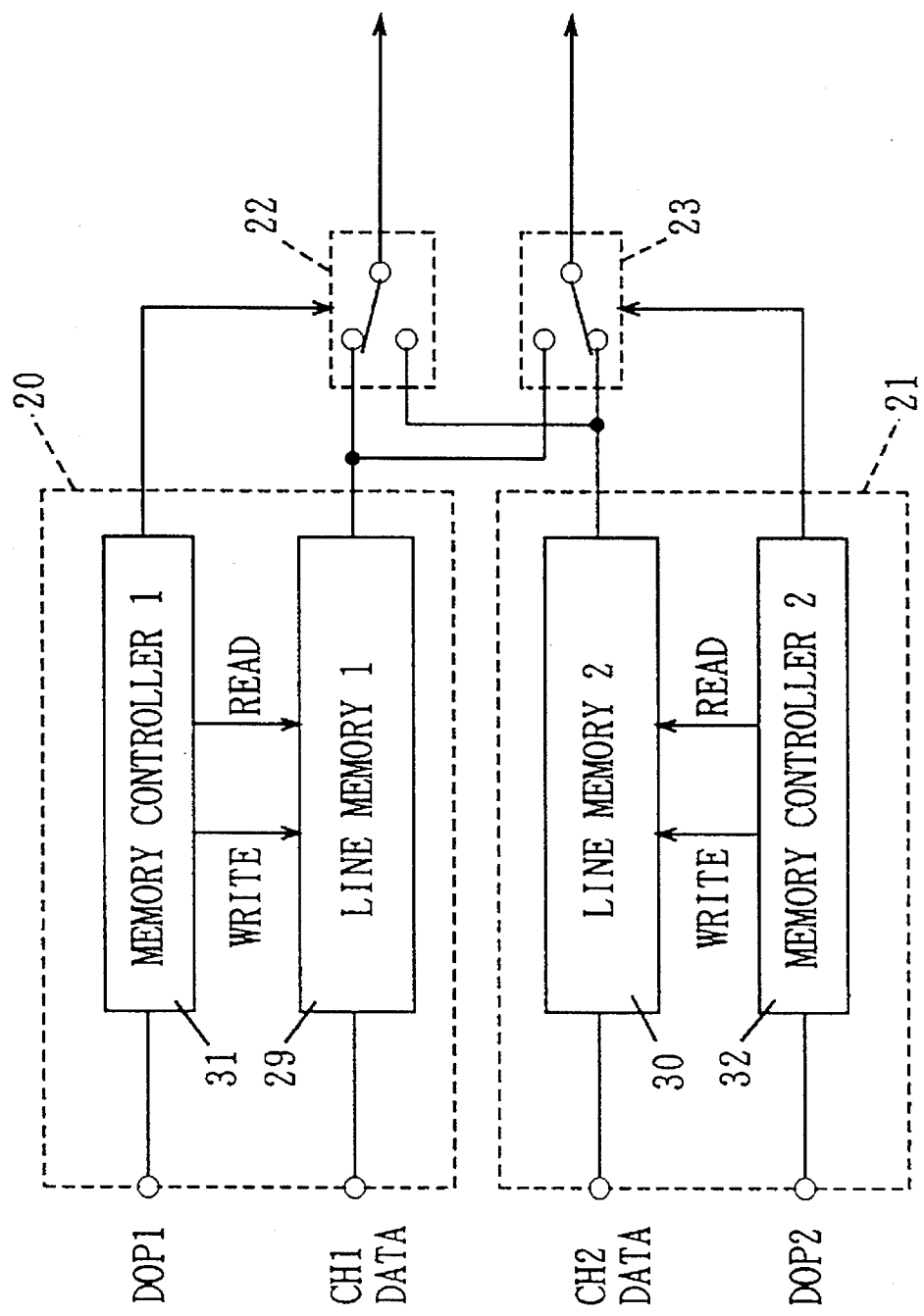
FIG. 7 is a block diagram showing in detail time base corrector circuits shown in FIG. 1.
Figure 16:
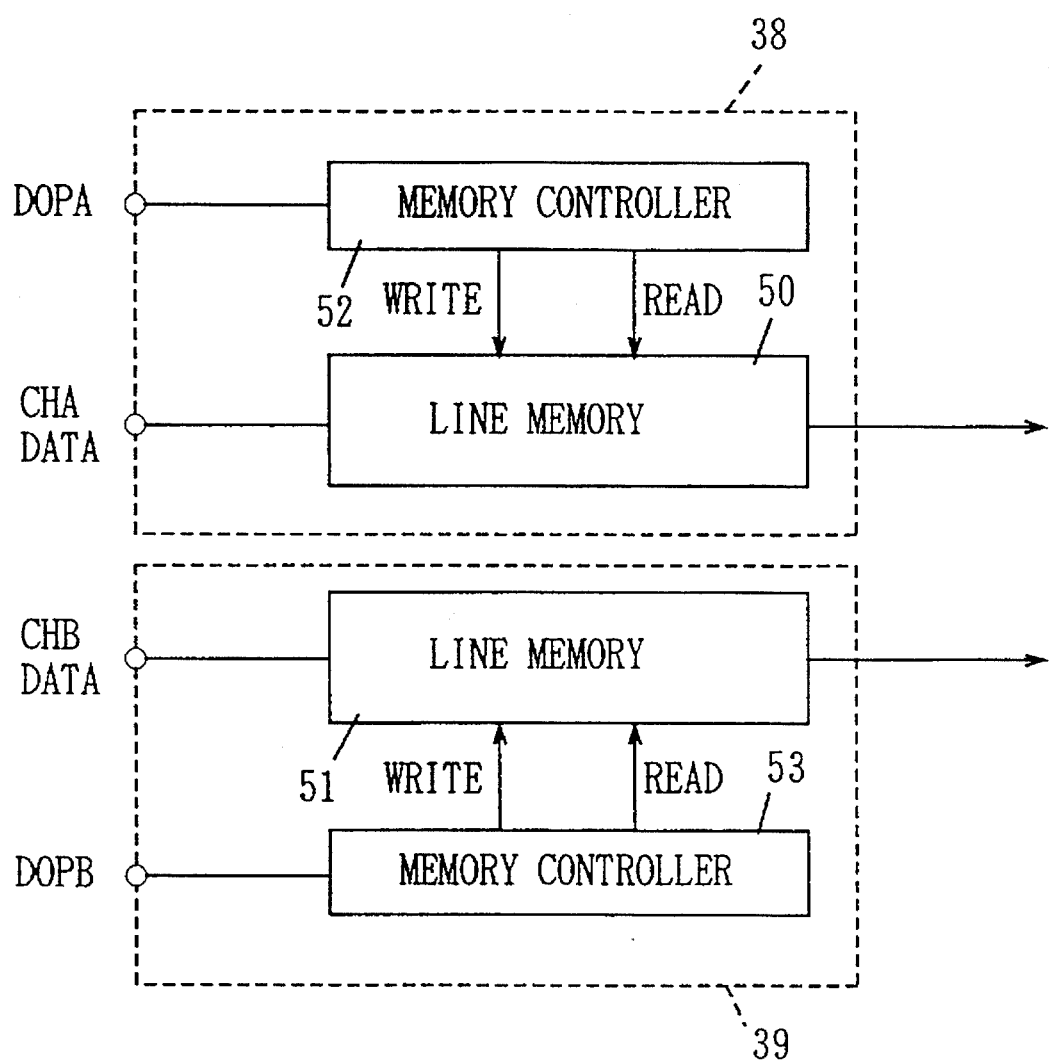
FIG. 16 is a block diagram of time base corrector circuits of background art.

An enhancement of the dropout compensation capability will now be described. FIG. 7 is a block diagram showing the details of the time base corrector circuits 20 and 21 and the switch circuits 22 and 23 shown in FIG. 1. With reference to FIG. 7, the time base corrector circuits 20 and 21 are different from those shown in FIG. 16 in that the circuits include a line memory 29 supplied with data of the channel CH1 in place of the data of the channel CHA, a line memory 30 supplied with data of the channel CH2 in place of the data of the channel CHB, a memory controller 31 for controlling the line memory 29 and the switch circuit 22, and a memory controller 32 for controlling the line memory 30 and the switch circuit 23. Each of the switch circuits 22 and 23 has two input terminals and one output terminal. One input terminal of each of the switch circuits 22 and 23 is connected to an output of the line memory 29, while the other input terminal is connected to an output of the line memory 30. Each output terminal is connected to an input of the deshuffling circuit 24. A write clock generating portion is omitted similarly to the background art example.

Figure 8:
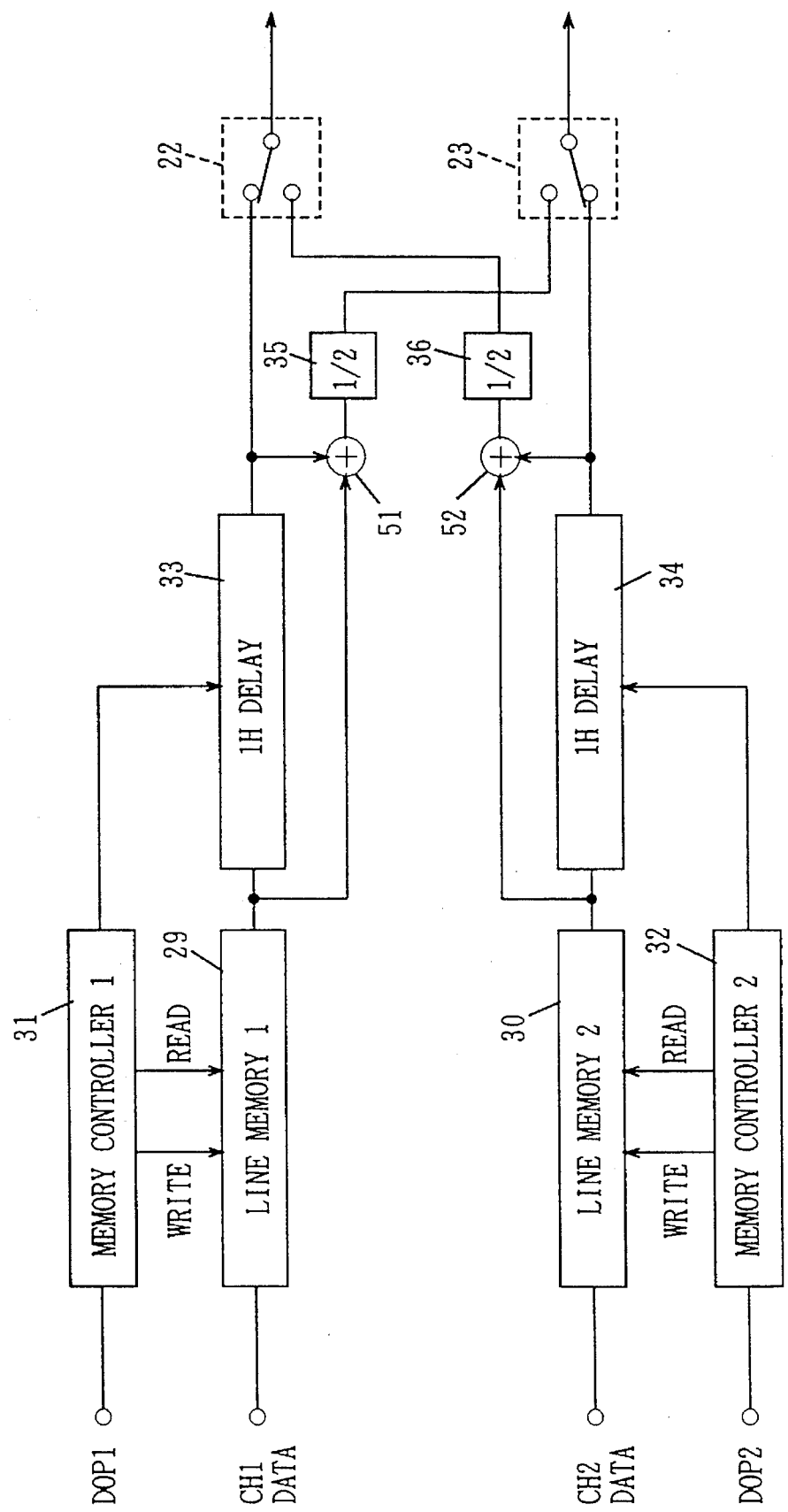
FIG. 8 is a block diagram showing a modification of the time base corrector circuits having an enhanced capability of dropout compensation.

In operation, the data of the channel CH1 having a time base change is input to the line memory 29. Similarly, the data of the channel CH2 having a time base change is input to the line memory 30. Those data are written by a clock signal having a time base change and read by a clock signal having no time base change, whereby the operation of time base correction is completed. Control of the respective line memories is made by the memory controllers 31 and 32. The switch circuits 22 and 23 are controlled also by the memory controllers 31 and 32. Switching of the switch circuits 22 and 23 by the memory controllers 31 and 32 makes it possible to transmit data of one of the channels to the other channel. Assume now that a dropout detection output detected by the FM demodulator 16 is input as a dropout signal DOP1 into the memory controller 31. When reading data of a dropout portion, the memory controller 31 switches the switch circuit 22 to select an output of the line memory 30. A dropout compensation is thus completed. This phenomenon will be described in further detail with reference to FIG. 4. Assume that there is a dropout in the location of video data ($P_R5$, Y5) in the channel CH1 of FIG. 4. For reading, the video data ($P_R5$, Y5) is replaced by video data ($P_R7$, Y7). In the background art example, the video data ($P_R5$, Y5) replaced by the video data ($P_R1$, Y1), which is 4H apart from the video data ($P_R5$, Y5), is replaced by the most correlative video data ($P_R7$, Y7) which is 2H apart therefrom. In order to further enhance accuracy of the dropout compensation, if the video data ($P_R5$, Y5) having a dropout is replaced by a mean value of video data ($P_R3$, Y3) and ($P_R7$, Y7), then the video data ($P_R5$, Y5) is replaced by the mean value of the video data which are 2H before and after the video data ($P_R5$, Y5), thereby enabling the most effective dropout compensation. FIG. 8 is a block diagram of a circuit for realizing such a most effective dropout compensation.

FIG. 8 shows an improvement of the time base corrector circuits shown in FIG. 7. With reference to FIG. 8, these time base corrector circuits are different from those of FIG. 7 in that the circuits include 1H delay circuits 33 and 34 at a succeeding stage of the line memories, adders 51 and 52 for taking a sum of outputs of the line memories and outputs of the 1H delay circuits, and ½ circuits 35 and 36 for taking a mean of outputs of the adders.

In operation, when read data of the line memory 30 is video data ($P_R7$, Y7), read data of the 1H delay circuit 34 is video data ($P_R3$, Y3). Since those data are added together and further made to ½ by the ½ circuit 36, a mean value of the video data ($P_R7$, Y7) and ($P_R3$, Y3) is output to one input terminal of the switch circuit 22. With the dropout compensation thus made, the video data can be replaced by the mean value of the video data which are 2H before and after the dropout. This enables a substantial increase in the dropout compensating capability as compared to the background art.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video signal recording and reproducing apparatus for dividing one field of a video signal into first and second channels and recording the divided signals on a recording medium, wherein said video signal comprises a luminance signal and first and second color difference signals, said apparatus comprising:

a plurality of A/D converting means for digitizing, respectively, said luminance signal, said first color difference signal and said second color difference signal, included in said video signal;

video signal outputting means for dividing one field of the digitized luminance signal and the digitized first and second color difference signals into a first channel video signal and a second channel video signal, each channel video signal comprising a first segment including part of said first color difference signal and a second segment including part of said second color difference signal, and for outputting said channel video signals; and recording means for simultaneously recording the first segments of the channel video signals from said video signal outputting means onto first and second tracks on said recording medium with a spacing between said first and second tracks of at least one track, and simultaneously recording the second segments of the channel video signals from said video signal outputting means onto third and fourth tracks on said recording medium so as to interpose one of the third track and the fourth track between the first and second tracks of the most recently recorded first segments.

2. The apparatus as recited in claim 1, wherein said video signal outputting means includes:

line sequential processing means for line sequentially processing the digitized first and second color difference signals, shuffling means for shuffling one field of each of said color difference signals which are line sequentially processed and the digitized luminance signal, and for dividing the shuffled signals into first and second channel video data, each channel video data comprising a first section including part of said first digitized color difference signal and a second section including part of said second digitized color difference signal, and signal converting means for converting each channel video data divided by said shuffling means into signals to be recorded on said recording medium.

3. The apparatus as recited in claim 2, wherein said line sequential processing means includes means for setting a time difference between said line sequentially processed digitized color difference signal and said digitized luminance signal.

4. The apparatus as recited in claim 2, wherein said shuffling means includes first and second storage means corresponding to said first and second channels, each having a storage capacity capable of storing one field of the digitized luminance signal and the digitized color difference signals, each of said first and second storage means including first and second segment storage regions for storing first and second section data, respectively, wherein the same digitized color difference signal is the subject of storing in the first segment storage regions of both first and second channels, and the other digitized color difference signal is the subject of storing in the second segment storage regions of both first and second channels.

5. The apparatus as recited in claim 4, wherein each of said first and second storage means includes two memories, each storing a ½ field of the digitized luminance signal and the digitized first and second color difference signals, wherein data is read from one of said memories while data is written in the other of said memories.

6. The apparatus as recited in claim 2, wherein said signal converting means includes:

D/A converting means for converting the first and second channel video data into first and second analog signals, respectively, frequency modulating means for frequency-modulating the first and second analog signals, and current amplifying means for current-amplifying the signals frequency-modulated by said frequency modulating means and applying the current-amplified signals to said recording means.

7. The apparatus as recited in claim 1, wherein said recording means includes:

a rotating drum, first and second magnetic heads provided on said rotating drum and having a first azimuth angle, and third and fourth magnetic heads provided at a position opposing 180° to said first and second magnetic heads on said rotating drum and having a second azimuth angle, wherein a spacing of at least one track is provided between said first and second magnetic heads and also between said third and fourth magnetic heads.

8. The video signal recording and reproducing apparatus of claim 1 wherein said plurality of A/D converting means digitizes said luminance signal and said first and second color difference signals at different sampling frequencies.

9. A video signal recording and reproducing apparatus for dividing one field of a video signal into first and second channels and recording the divided signals onto a recording medium, wherein said video signal comprises a luminance signal and first and second color difference signals, said apparatus comprising:

a plurality A/D converting means for converting said luminance signal, and said first and second color difference signals included in said video signal;

video signal outputting means for dividing one field of the converted luminance signal and the converted first and second color difference signals into first and second channel video signals, each channel video signal including a first segment having part of said first color difference signal and a second segment having part of said second color difference signal, and for outputting the channel video signals;

recording means for simultaneously recording the first segments of the first and second channel video signals from said video signal outputting means on first and second tracks on said recording medium with a spacing between said first and second tracks of at least one track, and simultaneously recording the second segments of the first and second channel video signals from said video signal outputting means on third and fourth tracks on said recording medium so as to interpose one of the third track and the fourth track between the first and second tracks of the most recently recorded first segments;

demodulating means for demodulating the first and second channel video signals recorded on said recording medium and for generating a control signal for compensating for a dropout of the demodulated first and second channel video signals;

dropout compensating means responsive to the control signal from said demodulating means for compensating for the demodulated first or second channel video signal with the demodulated channel video signal of the other channel; and reproducing means for reproducing the luminance signal and the first and second color difference signals from the demodulated or compensated first and second channel video signals.

10. The apparatus as recited in claim 9, wherein said video signal outputting means includes:

line sequential processing means for line sequentially processing the converted first and second color difference signals, shuffling means for shuffling one field of each of said converted color difference signals line sequentially processed and said converted luminance signal, and for dividing the shuffled signals into first and second channel video data, each channel video data comprising a first section including part of said converted first color difference signal and a second section including part of said second converted color difference signal, and signal converting means for converting each channel video data divided by said shuffling means into signals to be recorded on said recording medium.

11. The apparatus as recited in claim 10, wherein said line sequential processing means includes means for setting a time difference between said line sequentially processed color difference signal and said luminance signal A/D-converted by said A/D converting means to be an even horizontal period.

12. The apparatus as recited in claim 10, wherein said shuffling means includes first and second storage means corresponding to said first and second channels, each having a storage capacity capable of storing one field of said converted luminance signal and said converted color difference signal, each of said first and second storage means including first and second segment storage regions for storing first and second section data respectfully, wherein the same color difference signal is the subject of storing in the first segment storage regions of both first and second channels, and the other color difference signal is the subject of storing in the second segment storage regions of both first and second channels.

13. The apparatus as recited in claim 12, wherein each of said first and second storage means includes two memories, each storing a ½ field of luminance data and the first and second color difference signal data, wherein data is read from one of said memories while data is written in the other memory.

14. The apparatus as recited in claim 10, wherein said signal converting means includes:

D/A converting means for converting the video data of the first and second channels divided by said shuffling means into analog signals, frequency modulating means for frequency-modulating the signals of the first and second channels D/A converted by said D/A converting means, and current amplifying means for current-amplifying the signals frequency-modulated by said frequency modulating means to apply the current-amplified signals to said recording means.

15. The apparatus as recited in claim 9, wherein said recording means includes:

a rotating drum, first and second magnetic heads provided on said rotating drum and having a first azimuth angle, and third and fourth magnetic heads provided at a position opposing 180° to said first and second azimuth angle, wherein a spacing of at least one track is provided between said first and second magnetic heads and also between said third and fourth magnetic heads.

16. The apparatus as recited in claim 9, wherein said demodulating means includes:

means for current-amplifying the first and second channel video signals recorded on said recording medium, FM demodulating means for FM demodulating said current amplified first and second channel video signals, for detecting a dropout of the video signals, and for outputting a dropout detecting signal, A/D converting means for A/D converting said FM demodulated first and second channel video signals, and time base correcting means for time base correcting said A/D converted first and second channel video signals, and, responsive to said dropout detecting signal, for generating a control signal for a dropout compensation, initiating a dropout compensating operation.

17. The apparatus as recited in claim 16, wherein said time base correcting means includes:

a first line memory for holding an amount of the A/D converted first channel video signal data, a second line memory for holding said amount of the A/D converted second channel video signal data, and first and second memory control means provided corresponding to said first and second line memories, for controlling, writing, and reading said first and second line memories, responsive to said dropout detecting signal.

18. The recording apparatus as recited in claim 9, wherein said dropout compensating means includes first and second switching means, each responsive to said control signal, each connected between said demodulating means and said reproduction means, for selecting the demodulated second and first channel video signals, respectively.

19. The apparatus as recited in claim 9, wherein said dropout compensating means includes:

mean value calculating means, responsive to the control signal generated by said demodulating means, for calculating a mean value of the channel video signals before and after a period relating to a dropout portion, and means responsive to said control signal for applying said mean value to said reproduction means.

20. The video signal recording and reproducing apparatus of claim 9 wherein said plurality of A/D converting means converts said luminance signal and said first and second color difference signals at different sampling frequencies.

21. A video signal recording and reproducing method for dividing one field of a video signal into first and second channels and recording the divided signals on a recording medium, wherein said video signal comprises a luminance signal and first and second color difference signals, said method comprising the steps of:

A/D converting a luminance signal and first and second color difference signals included in said video signal;

dividing one field of the A/D converted luminance signal and said converted firsthand second color difference signals into first and second channel video signals, each channel video signal comprising a first segment including part of said first color difference signal and a second segment including part of said second color difference signal, and outputting the channel video signals; and simultaneously recording the first segments of the first and second channel video signals on first and second tracks on said recording medium with a spacing between said first and second tracks of at least one track, and simultaneously recording the second segments of the channel video signals on third and fourth tracks on said recording medium so as to interpose one of the third track and the fourth track between the first and second tracks of the most recently recorded first segments.

22. The method of claim 21 wherein the step of A/D converting converts said luminance signal and said first and second color difference signals at different sampling frequencies.

23. A video signal recording and reproducing method for dividing one field of a video signal into first and second channels and recording the divided signals on a recording medium, wherein said video signal comprises a luminance signal and first and second color difference signals, said first and second said method comprising the steps of:

A/D converting said luminance signal and said first and second color difference signals included in said video signal;

dividing one field of the A/D converted luminance signal and said converted first and second color difference signals into a first channel video signal and a second channel video signal, each channel video signal including a first segment having part of said first color difference signal and a second segment having part of said second color difference signal, and outputting the channel video signals;

simultaneously recording the first segments of said first and second channel video signals on first and second tracks on said recording medium with a spacing between said first and second tracks of at least one track, and simultaneously recording the second segments of said channel video signals on third and fourth tracks on said recording medium so as to interpose one of the third track and the fourth track between the first and second tracks of the most recently recorded first segments;

demodulating said first and second channel video signals recorded on said recording medium, and generating a control signal for compensating for a dropout of the demodulated first and second channel video signals;

compensating for the demodulated first or second channel video signal with the demodulated channel video signal of the other channel in response to said control signal; and reproducing the luminance signal and the first and second color difference signals from the demodulated or compensated first and second channel video signals.

24. The method of claim 23 wherein the step of A/D converting converts said luminance signal and said first and second color difference signals at different sampling frequencies.

* * * * *